A. O. DAVIS.
SPROCKET GUARD FOR CYCLES.
APPLICATION FILED JULY 17, 1914.
1,136,411.
Patented Apr. 20, 1915.
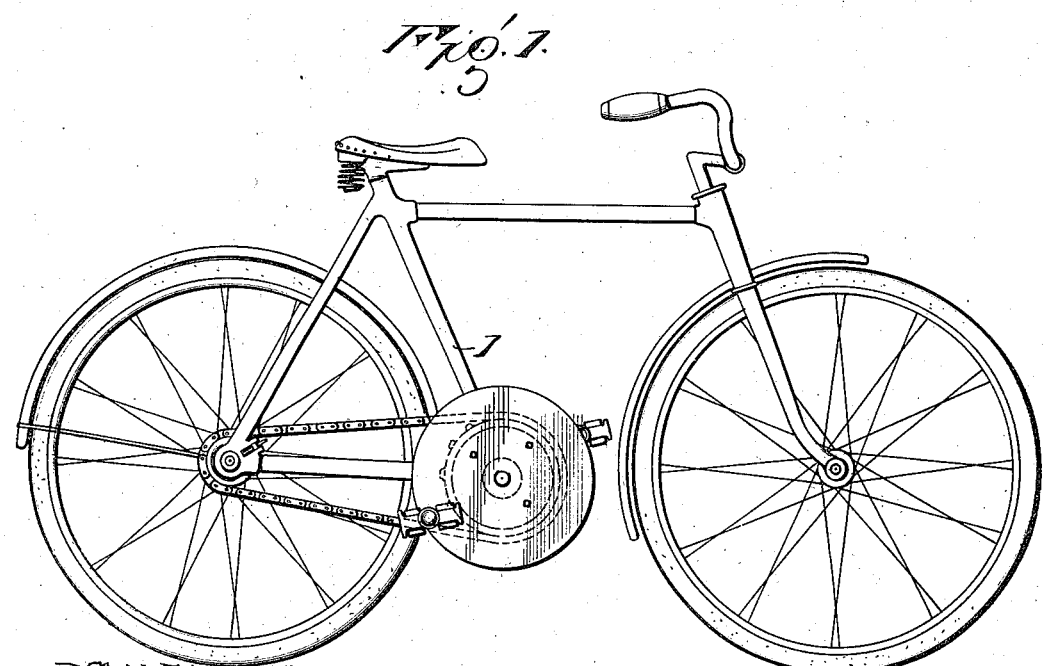
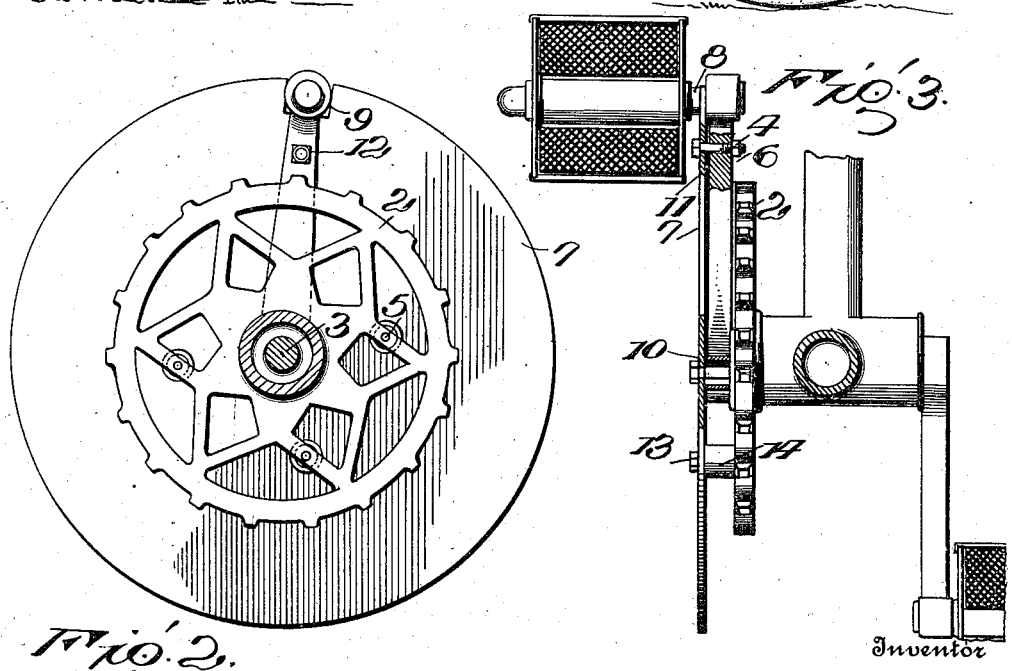

UNITED STATES PATENT OFFICE.

ADOLPHUS O. DAVIS, OF WILSON, NORTH CAROLINA.

SPROCKET-GUARD FOR CYCLES.

1,136,411.  Specification of Letters Patent.  Patented Apr. 20, 1915.

Application filed July 17, 1914. Serial No. 851,615.

*To all whom it may concern:*

Be it known that I, ADOLPHUS O. DAVIS, citizen of the United States, residing at Wilson, in the county of Wilson and State of North Carolina, have invented certain new and useful Improvements in Sprocket-Guards for Cycles, of which the following is a specification.

This invention relates to bicycle attachments, and has as its object to provide a pants-guard attachment for the front sprocket wheel.

It is one aim of the invention to provide a pants-guard attachment on a bicycle or motorcycle which will prevent the rider's pants legs catching in the gearing and becoming torn and which will, in its use, obviate the use of the usual pants guards or clips which are liable to become misplaced and which are unsightly and produce creases in the trouser legs.

It is another object of the invention to provide an attachment for the purpose stated which will not in any way be liable to interfere with the gearing but which will, on the other hand, to a certain extent, protect the gearing against injury and which will add to the appearance of the bicycle or motorcycle.

Another aim of the invention is to provide an attachment for the purpose mentioned of such construction that it may be readily applied to any ordinary or standard make of bicycle without materially altering any part of the bicycle.

The invention aims still further to provide an attachment of the character mentioned which may serve as an advertising medium.

In the accompanying drawings: Figure 1 is a side elevation of the device applied to a bicycle. Fig. 2 is a detail view looking at the opposite side of the device and illustrating also the front sprocket to which the same is applied. Fig. 3 is a view partly in front elevation and partly in section of the device applied.

Corresponding and like parts are referred to in the following description and indicated in all the views of the accompanying drawings by the same reference characters.

In the drawings, the numeral 1 indicates in general a bicycle to which the attachment is applied and the numeral 2 indicates the front or drive sprocket thereof. The sprocket 2 is of the ordinary construction and is mounted on the pedal crank shaft which is indicated by the numeral 3, one of the pedal cranks being indicated by the numeral 4 and this crank being the one which extends beside the sprocket 2. For a purpose to be presently explained, the frame work or body of the sprocket is formed at suitable intervals with openings 5 and the pedal crank is formed with an opening 6 near its outer end.

The attachment embodying the present invention comprises a flat circular plate 7 which is preferably of sheet metal and of a diameter greater than the diameter of the sprocket 2. The plate 7 is, as stated, of sheet metal and sufficiently stout and rigid to withstand the ordinary blows to which it is liable to be subjected in use. The spindle for the pedal, which is supported by the crank 4, is indicated by the numeral 8, and the plate 7 is formed in its periphery with a notch 9 to receive the inner end of the said spindle, the plate being further formed with openings 10 spaced to correspond in location to the openings 5, and with an opening 11 arranged to be located opposite the opening 6 in the crank 4 when the plate is in proper position with respect to the sprocket and crank.

In applying the attachment, the plate is disposed beside the pedal crank and sprocket gear and a bolt 12 is secured through the openings 6 and 11 thereby securing the plate to the pedal crank. Other bolts 13 are fitted through the openings 10 and 5 and through spacing collars 14 which are interposed between the body portion of the sprocket and the opposing side of the plate 7. The rollers 14 of course serve to space the plate from the sprocket gear in such a manner that it will occupy a plane parallel to the plane of the gear. By reference to Fig. 1, it will be apparent that the guard plate 7, being of a diameter greater than that of the sprocket gear 2, covers the face of the gear and the stretches of the sprocket chain immediately rearwardly of the sprocket gear, so that the rider's pants legs are prevented from catching in the gearing or becoming soiled by contact therewith. It will of course be understood that the openings 10 and 11 may be located at various points in the area of the guard plate, depending upon the form of sprocket gear to which the plate is to be attached, and in fact if desired, the plate may be formed with a number of openings so that several may be selected suitable to one type or another of gear.

It will be apparent that inasmuch as the guard plate serves to conceal one side of the gear, it adds to the appearance of the bicycle and if desired may be ornamented or an advertisement may be printed or painted or otherwise marked upon its outwardly presented face.

Having thus described the invention, what is claimed as new is:

1. As a new article of manufacture, a guard plate provided with means for attachment to the front sprocket and outer face of the adjacent crank of a bicycle and having its periphery formed with a notch to engage the spindle of the pedal carried by said crank.

2. The combination of the front sprocket of a bicycle, a crank adjacent the sprocket, and a pedal having its spindle fitted to the end of said crank, of a guard plate disposed beside the crank and sprocket and against the outer face of the crank and peripherally engaging the pedal spindle, securing means fastened through the plate and crank, and securing and spacing means fastening the plate to the outer face of the sprocket in spaced relation thereto.

3. The combination of a sprocket, a crank connected with the sprocket, and a pedal spindle at the outer end of the crank, of a guard plate disposed entirely in a plane outside of and parallel with the crank and sprocket and having a notch in its edge engaging the pedal spindle, a fastening bolt passed through the plate and the crank, other bolts passed through the plate and the sprocket, and spacing collars around the last-mentioned bolts between the plate and sprocket.

In testimony whereof I affix my signature in presence of two witnesses.

ADOLPHUS O. DAVIS. [L. S.]

Witnesses:
O. P. DICKINSON,
GEO. T. ARONACH.